United States Patent Office

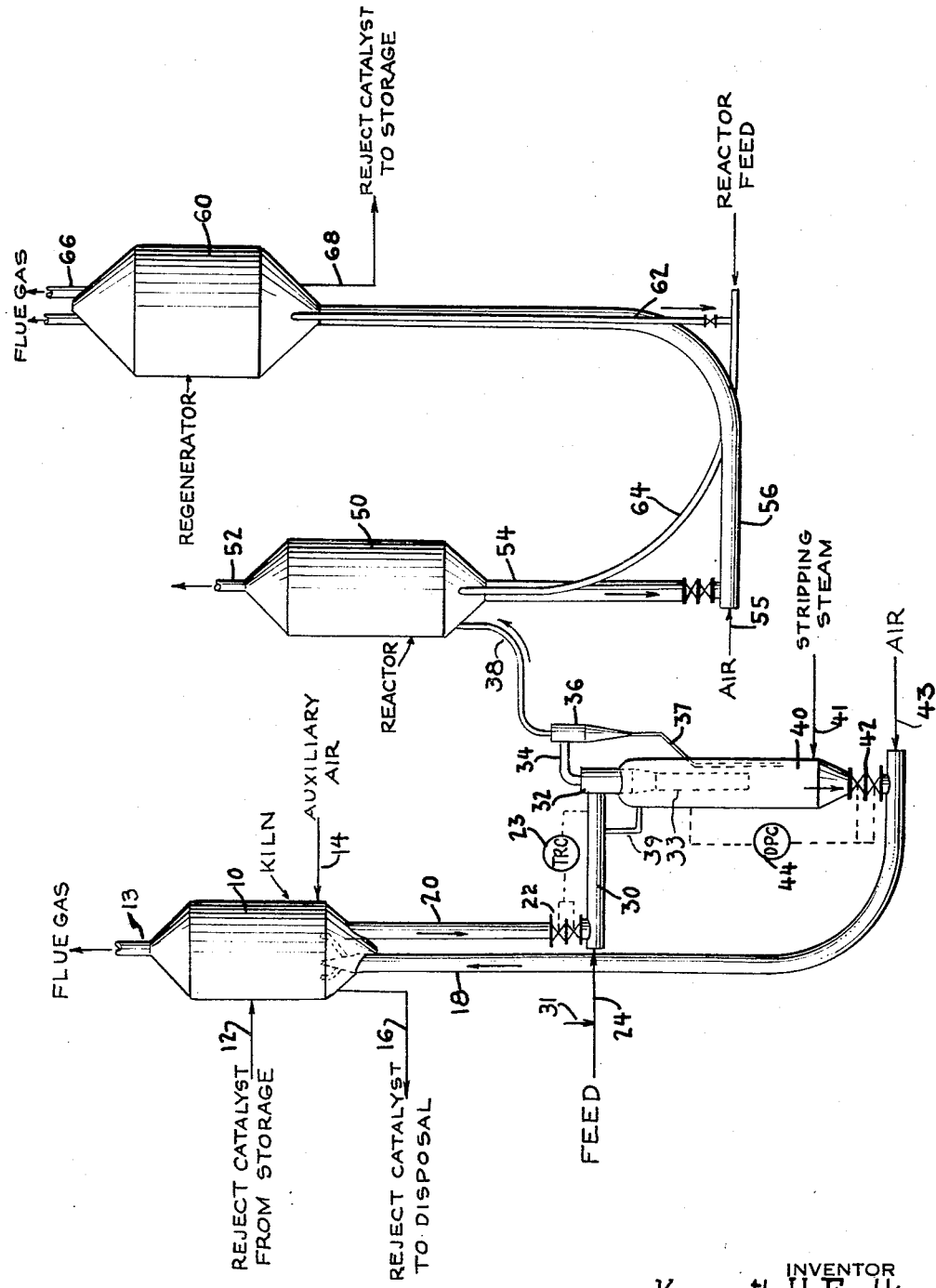

2,944,002
Patented July 5, 1960

2,944,002

REMOVAL OF NON-VOLATILE COMPONENTS FROM A CATALYTIC CRACKING FEED USING A REJECT CRACKING CATALYST

Kenneth H. Faulk, Lake Charles, La., assignor to Cities Service Research and Development Company, New York, N.Y., a corporation of New Jersey Filed Oct. 9, 1957, Ser. No. 689,137

3 Claims. (Cl. 208—91)

This invention relates to improvements in the catalytic conversion of hydrocarbons. More particularly, this invention relates to a new and improved method of reducing contaminants in the hydrocarbon feeds utilized in fluidized catalytic cracking systems.

In conventional fluidized catalytic cracking systems, feed stocks containing high coke forming constituents and substantial quantities of non-volatile metals substantially reduce the overall efficiency of the system. The presence of comparatively high amounts of coke forming materials results in a high carbon lay-down on catalyst, necessitating an increase in regeneration requirement. The presence of non-volatile metal compounds of such metals as sodium, iron, vanadium, nickel, and copper, poison catalyst and result in high gas and coke yield at the expense of the desired products.

These undesirable results flowing from contaminated cracking feeds are avoided in part in current practice by keeping contaminated feed quantity at a minimum and by utilizing a high catalyst flushing rate to prevent a build-up of the contaminants in the reactor bed. Quite obviously it is not always possible to avoid the use of contaminated feeds and therefore various pre-treating techniques have been utilized. One method used in removing coke forming components from the feed is the deasphalting treatment of the feed. Such a process while limiting the carbon residue which forms coke, has little effect on the metal compounds contained in the feed. Another treatment of contaminated feeds proposed is one in which the feed stock is pre-treated by contacting the same with spent catalyst prior to introducing the feed to the fluidized reaction zone. Typical of the latter is the process set forth in U.S. 2,432,644, December 16, 1947 wherein partially spent catalyst contacts feed containing deleterious materials such as sulphur and nitrogen bases which adversely effect the desired cracking reaction. While such a process avoids in part the undesirable results flowing from the presence of contaminants of the feed, the utilization of the catalyst from the pre-treating step in the main reaction zone seriously limits the effectiveness of this pre-treating method. This is particularly so when the hydrocarbon feed contains the poisonous metal compounds which are primarily responsible for catalyst contamination and loss of efficiency.

It is accordingly an object of the present invention to pre-treat cracking unit feed stocks in a manner that will substantially reduce catalyst contamination.

It is a further object of the present invention to reduce the amount of non-volatile metal contaminants normally present in cracking feeds which cause catalyst poisoning.

It is another object of this invention to pre-treat catalytic cracking feeds in a manner that will increase the capacity of the unit and provide substantial improvement in the recovery of the desired products.

It is a further object of the present invention to pre-treat heavy feed stocks in a manner that will permit upgrading of heavy stocks to stocks suitable as cracking feeds.

A further advantage over prior art is obtained by keeping metal contaminated catalyst from use in the main cracking reaction.

These and other advantages are obtainable according to the present invention by an improved method of pre-treating heavy carbon and metal contaminated cracking feed stocks. Treatment of feed stocks is accomplished according to the present invention by contacting the feed with a portion of hot reject catalyst in a contact zone for a short period of time. The brief contact of hot reject catalyst and feed vaporizes the feed and results in a lay-down of the carbon forming components as well as the undesirable metals on the reject catalyst. The vapor and catalyst are then introduced into a separating zone wherein catalyst and vapor are separated. The vapor after separation, is passed directly to the fluidized bed of a conventional fluid cracking reactor. The separated catalyst containing the metal contaminants and combustible coke-forming materials is withdrawn from the separator and passed to a kiln wherein a portion of the combustible material on the catalyst is burned. The temperature of kiln containing the reject catalyst is maintained sufficiently high so that on being delivered to the contact zone for contact with the feed there will result the desired coke and non-volatile metal contaminant lay-down. As metal contaminants build up on the reject catalyst to an undesirable level the catalyst is withdrawn from the pre-treating system and disposed of as waste. Fresh reject catalyst obtained from the cracking unit regenerator can then be added to the kiln to maintain the desired reject catalyst inventory.

The pre-treating of cracking feeds according to the improved vapor phase method of the present invention results in substantial savings in catalyst purchases since it permits a reduction in the catalyst flushing rate of the fluidized cracking unit. The pre-treating of feeds according to the present invention, increases the cracking unit capacity by removing the heavy asphaltic compounds which go directly to coke and would thus unnecessarily burden the regenerator capacity which is normally the cracking unit limitation. The present invention, in addition to reducing catalyst consumption and generally improving the product yield, permits the use of heavier contaminated stocks which were not previously suited for catalytic cracking. A further advantage results in the utilization of reject catalyst a product which has heretofore been dumped as waste.

In the accompanying drawing there is shown diagrammatically one method of carrying out the method of the present invention. Referring now to the drawing, numeral 10 represents a kiln containing a quantity of reject catalyst. This reject catalyst inventory is introduced to kiln 10 by way of line 12. Since a portion of the coke laid-down on the reject catalyst is continuously burned to maintain kiln temperature, combustion air is used for control of kiln temperature introduced by line 14.

An additional quantity of combustion supporting air is introduced at 43 and is used to return catalyst to the kiln as hereafter described. Kiln 10 introduces a flue gas exit 13 in the upper portion and a reject catalyst withdrawal line 16 in the bottom of the kiln. Line 16 is utilized to remove from the system, intermittently or on a continuous basis, reject catalyst containing an undesirable high amount of the non-volatile contaminating metals.

In the lower portion of kiln 10 a reject catalyst withdrawal line 20 is provided. Line 20 is connected to contact zone 30 by slide valves 22 which are controlled by regulator 23. Valves 22 are used to control the withdrawal of hot reject catalyst from kiln 10 and the delivery of the same to contact zone 30.

In addition to the stream of hot reject catalyst introduced to contact zone 30, by way of line 20 a stream of hot contaminated feed and steam is injected to zone 30 by line 31. In zone 30 the feed and catalyst are contacted for a short period of time in the dispersed state and then passed immediately to separator 32. Separator 32 can be of the cyclone type or an equivalent apparatus which will effect separation of feed vapor and hot reject catalyst. In separator 32 the vaporized feed and reject catalyst are separated with the vapors being withdrawn through lines 34 and 38 and passed to reactor 50 directly or preferably through a secondary separator 36 wherein a more complete separation of vaporized feed and catalyst is accomplished and thence to reactor 50. Catalyst separated from feed in cyclones 32 and 36 is returned to stripping standpipe 40 by way of lines 33 and 37.

To effect removal of hydrocarbon vapors from the reject catalyst, catalyst delivered to 40 is stripped with steam introduced by line 41. Hydrocarbon vapor removed by stripping is withdrawn from stripping standpipe 40 through line 39 and reintroduced into the contact zone 30 or passed directly into line 34 or 38 by means not shown for delivery to reactor 50.

After stripping hydrocarbon vapors from the reject catalyst, the contaminated particles are withdrawn from standpipe 40 through sliding control valves 42 and introduced to line 18. The flow of contaminated reject catalyst from standpipe 40 through valves 42 is regulated by the controller 44. On delivery to transfer line 18 from standpipe 40 combustion supporting air introduced at 43 returns the contaminated reject catalyst to kiln 10.

The vaporous feed after pre-treatment in contact zone 30 and separation is passed by line 38 to reactor 50 which contains a fluidized bed of catalyst, similar to the reaction bed maintained in a conventional fluidized cracking unit. Therein feed and catalyst are contacted under conditions which effect cracking of the feed to the desired products. These products are withdrawn through line 52 and passed to further processing equipment for further treatment according to standard practice. Spent catalyst containing a lay down of carbon from the cracking reaction is continuously withdrawn from reactor 50 through line 54 and transferred by line 56 to regenerator 60. In regenerator 60 a fluidized bed is maintained by means of which coke laid-down on the catalyst in the cracking zone is removed by partial combustion. After regeneration, the hot catalyst is withdrawn from regenerator 60, through line 62 combined with feed introduced at 63 and transferred by way of line 64 to cracking reactor 50. The feed introduced at 63 would preferably be a light feed comparatively free of the contaminants normally found in the feeds introduced to the pretreating described above.

Reject catalyst not suitable for further regeneration in regenerator 60 is withdrawn by way of line 68 intermittently or on a continuous basis as desired and placed in a storage hopper not shown. It is this catalyst after heating in kiln 10 which is utilized in the pre-treatment of the contaminated feed in contact zone 30. Reject catalyst withdrawn in line 68 can be introduced directly to kiln 10 if desired in a continuous operation or may be introduced intermittently by line 12 depending on the extent of the contamination build-up on the reject catalyst during contact with the contaminated feed.

In carrying out the treatment of catalytic cracking feed according to the method of the present invention, it will be necessary to maintain the fluidized bed in kiln 10 at a temperature of approximately 1200° F. Fluidization of kiln 10 is obtained by the introduction of combustion air at 43. The auxiliary air is introduced at 14 at a controlled rate to keep the process in heat balance and assists in fluidizing the bed in kiln 10. The quantity of reject catalyst withdrawn in line 16 and dumped to waste will depend on the amount of reject catalyst available from 60 and on the rate of build-up of contaminants on the catalyst.

The lay down of feed contaminants on the hot reject catalyst is accomplished in the contact zone 30 and is made possible by maintaining a temperature of at least 900° F. in the contact zone and preferably a temperature of between about 950° and 1000° F. Contaminated feed introduced at 24 will be at a temperature of from about 700° F. to 850° F. and preferably will be at a temperature of about 750° to 800° F. to facilitate the vaporization of the feed and minimize cracking in the contact zone. Steam is injected along with the feed to assist in vaporizing the feed by reducing the partial pressure of the same so that a quicker and more effective contact of reject catalyst and feed can be obtained. If desired, the feed introduced in line 31 may be a comparatively heavy feed which has been blended with a lighter stock such as a virgin gas oil or cycle stock.

The vaporized feed and hot reject catalyst are permitted to remain in the contact zone for only a very short period of time, generally not more than from one to three seconds so as to minimize the amount of cracking of the feed. Continuous introduction of the feed and hot reject catalyst to the contact zone 30 will sweep previously introduced feed and contaminated catalyst particles from the contact zone to the primary cyclone 32 wherein the major separation of catalyst and vapor is accomplished. The vaporized feed, as previously mentioned, is then transferred to a secondary cyclone 36 by line 34 if desired and thence by line 38 to regenerator 50. The feed, as has been indicated, is vaporized on contact with the hot reject catalyst. However when a comparatively light feed is being pretreated it may be advantageous to vaporize the same in a suitable heater prior to introducing the same to the contact zone.

In the preceding description reject catalyst has been generally referred to as the material upon which contaminants are deposited. For purposes of the present invention the use of such material is preferred. However if it is desired other similar materials possessing the necessary temperature stability and low attrition characteristics can be used.

To understand more completely the effect of pre-treating a contaminated cracking feed prior to introducing the same to a cracking unit according to the method of the present invention the following example is provided. This example is based on a treatment carried out in a unit of the type described on 10,000 b.p.d. of a 21° API deasphalted gas oil.

Five thousand b.p.d. of virgin light gas oil is added to 10,000 b.p.d. of deasphalted gas oil. The blended stream is heated to a temperature of 750° F. and injected into contact zone together with 10,000 lbs./hr. of steam. Reject catalyst at a temperature of 1200° F. is withdrawn from the fluidized kiln 10 at a rate of 5.8 tons/min. and introduced into a contact zone 30 at a controlled rate by slide valve 22. Contact of the feed and hot reject catalyst is maintained for approximately 1½ seconds after which the catalyst and vapor are passed to the primary cyclone in which the catalyst and vapor are separated. The vapor stream is then passed through a secondary cyclone and thence to the bed of a fluidized cracking reactor. Approximately 5 tons/day of the catalyst will remain in the vapor stream passed to the cracking unit reactor.

Catalyst removed from the feed vapor in the cyclone is contacted in the stripping stand pipe 40 with 7,500 lbs./hr. of steam. After contact with the steam the stripped catalyst is withdrawn from the stripping stand pipe under the control of slide valves 42 and introduced into return line 18 together with carrier air injected into line 18 at the rate of 25,000 lbs./hr. The density of the catalyst returning to the kiln by way of line 18 will be approximately 4.0 lbs./c.f.

Kiln 10, having a capacity of 90,000 lbs. of catalyst, is maintained at a temperature of 1200° F. Control of this temperature is provided by auxiliary combustion air introduced into the kiln by way of line 14 at the rate of 31,000 lbs./hr. At this rate with the inventory provided, the average catalyst residence or burning time in kiln 10 is approximately 7.8 minutes.

To maintain a comparatively low level of contaminants on the catalyst approximately 20 tons/day is withdrawn from the kiln bed. This 20 tons comprises approximately 15 tons/day of catalyst and 5 tons/day of coke. To maintain the desired inventory 20 tons/day of reject catalyst withdrawn from the regenerator of the cracking unit or from a storage hopper is added to kiln 10.

In the table which follows an analysis is provided of the deasphalted gas oil feed. In column A an analysis of the contaminant components of the stream is provided prior to contact in the contact zone. In column B an analysis of the feed after contact, with the reject catalyst is provided:

| Components | A<br>Liquid Entering, Lbs./hr. | B<br>Vapor Leaving, Lbs./hr. |
| --- | --- | --- |
| Sodium | 0.068 | 0.010 |
| Iron | 0.352 | 0.052 |
| Nickel | 0.149 | 0.022 |
| Vanadium | 0.135 | 0.047 |
| Copper | 0.203 | 0.030 |
| Carbon Residue Coke | 5,410 | 500 |

From the foregoing table it will be quite apparent that a substantial reduction in both the non-volatile metal compounds and the carbon residue coke of the deasphalted gas oil feed can be obtained. It will be noted that the carbon residue coke quantity is reduced by approximately 90% with the metallic content of sodium, iron, nickel, and copper being reduced by approximately 85%. The vanadium is reduced by approximately 65%.

It is believed quite apparent that the reduction in contaminants in the order suggested will have a substantial and favorable increase on the overall efficiency of the fluid cracking unit. The removal of such contaminants according to the process defined prevents their delivery to the fluid unit reactor and thus removes from the system the inherent disadvantages resulting from their presence. Specifically, improved yield, increased capacity, reduction in catalyst consumption, and upgrading of poor stocks can be obtained.

In a fluid cracking unit of the type shown to which 30,000 b.p.d. of reactor feed are introduced together with the decontaminated feed introduced by way of line 38, an increase in desirable product of from 1 to 5% can be expected under normal operating conditions.

As previously pointed out, this invention avoids the deleterious effects of the metal containing compounds which normally deposit catalytically active metals on the catalyst after regeneration. Pretreatment of the feed according to the method described herein avoids this result at no real increase in utility requirements, and with substantial savings in catalyst cost.

It will, of course, be understood that this invention is not limited to the particular operating conditions or types of feed mentioned.

There is comparatively a wide choice of operating conditions which must necessarily be adjusted in accordance with the particular characteristics of the feed and the results desired. Specifically the temperature at which the contact zone is operated may vary from approximately 800° F. to 1,000° F. In a similar manner both the temperature of the catalyst withdrawn from the kiln and the temperature of the feed introduced into the contacting zone will be varied depending on the temperature requirements of the contact zone. In a similar manner the catalyst to oil ratio will vary with both the oil temperature and the kiln temperature and also with the contact temperature required to vaporize the oil. With respect to the operating pressures employed near atmospheric pressures will normally be used. Under certain circumstances it may be desirable, however, to operate at pressures slightly below atmospheric or at pressures substantially above even in the order of 500 lbs./sq. in. or greater.

I claim:
1. A method of removing non-volatile components from catalytic cracking feed stocks which comprises passing reject catalyst from a fluidized cracking regenerator into a fluidized kiln maintained at a temperature of at least about 1100° F., withdrawing hot reject catalyst from said kiln and passing the same to a fluidized, horizontal contact zone maintained at a temperature of at least about 900° F., introducing a hydrocarbon feed containing the non-volatile contaminants to a contact zone, introducing sufficient steam to said contact zone to reduce the partial pressure of the feed introduced therein, maintaining contact between the reject catalyst and vaporized feed for a period of time less than five seconds, passing the feed and reject catalyst to a separating zone wherein vaporized feed and reject catalyst are separated, passing the separated feed vapors to a secondary separating zone wherein further separation of reject catalyst and vaporized feed is accomplished, passing the separated vapors from the secondary separating zone to the fluidized reaction zone of a fluid cracking unit, combining separated reject catalyst of the primary and secondary separating zones, subjecting the combined catalyst streams to stripping steam, recycling stripped feed vapors to the contact zone at a point just prior to the point of introduction of the reject catalyst and vaporized feed to the primary separating zone, said stripped feed vapors being introduced to the contact zone in a manner to aid fluidization in said zone, recycling the combined stripped reject catalyst streams to the fluidized kiln and withdrawing contaminated reject catalyst from the kiln to waste disposal at substantially the same rate that fresh reject catalyst is delivered to said kiln.

2. A method of removing non-volatile components from catalytic cracking feed stocks which comprises passing reject catalyst from a fluidized cracking regenerator into a fluidized kiln maintained at a temperature of at least about 1100° F., withdrawing hot reject catalyst from said kiln and passing the same to a fluidized contact zone maintained at a temperature of at least about 900° F., introducing a hydrocarbon feed containing the non-volatile contaminants to a contact zone, introducing sufficient steam to said contact zone to reduce the partial pressure of the feed introduced therein, maintaining contact between the reject catalyst and vaporized feed for a period of time less than five seconds, passing the feed and reject catalyst to a separating zone wherein vaporized feed and reject catalyst are separated, passing the separated feed vapors to a secondary separating zone wherein further separation of reject catalyst and vaporized feed is accomplished, passing the separated vapors from the secondary separating zone to the fluidized reaction zone of a fluid cracking unit, combining separated reject catalyst of the primary and secondary separating zones, subjecting the combined catalyst streams to stripping steam, recycling stripped feed vapors to the contact zone at a point just prior to the point of introduction of the reject catalyst and vaporized feed to the primary separating zone, recycling the combined stripped reject catalyst streams to the fluidized kiln and withdrawing contaminated reject catalyst from the kiln to waste disposal at substantially the same rate that fresh reject catalyst is delivered to said kiln.

3. A method of removing non-volatile components from catalytic cracking feed stocks which comprises passing reject catalyst from a fluidized cracking regenerator into a fluidized kiln maintained at a temperature of at least about 1100° F., withdrawing hot reject catalyst from said kiln and passing the same to a fluidized contact zone maintained at a temperature of at least about 900° F., introducing a hydrocarbon feed containing the non-volatile contaminants to a contact zone, introducing sufficient steam to said contact zone to reduce the partial pressure of the feed introduced therein, maintaining contact between the reject catalyst and vaporized feed for a period of time less than five seconds, passing the feed and reject catalyst to a separating zone wherein vaporized feed and reject catalyst are separated, passing the separated vapors to the fluidized reaction zone of a fluid cracking unit, subjecting the separated reject catalyst to stripping gas, recycling stripped feed vapors to the separating zone, recycling reject catalyst to the fluidized kiln and withdrawing contaminated reject catalyst from the kiln to waste disposal at substantially the same rate that fresh reject catalyst is delivered to said kiln.

References Cited in the file of this patent

UNITED STATES PATENTS

| | | |
|---|---|---|
| 2,378,531 | Becker | June 19, 1945 |
| 2,414,973 | Nelson | Jan. 28, 1947 |
| 2,521,757 | Smith | Sept. 12, 1950 |
| 2,605,214 | Galstaun | July 29, 1952 |
| 2,614,068 | Healy et al. | Oct. 14, 1952 |
| 2,689,825 | McKinley | Sept. 21, 1954 |
| 2,761,821 | Jahnig | Sept. 4, 1956 |